(12) United States Patent
Burda et al.

(10) Patent No.: US 7,653,450 B2
(45) Date of Patent: Jan. 26, 2010

(54) SYSTEM AND METHOD FOR CREATION OF OPTIMAL RANGE BOUNDARIES IN A RANGE MANAGEMENT SYSTEM

(75) Inventors: Richard G. Burda, Pleasant Valley, NY (US); Aseem K. Joshi, Wappingers Falls, NY (US); Sameer T. Shikalgar, Wappingers Falls, NY (US); Susan Kangas van Oss, Lagrangeville, NY (US); Patrick R. Varekamp, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 11/393,028

(22) Filed: Mar. 30, 2006

(65) Prior Publication Data

US 2007/0239298 A1   Oct. 11, 2007

(51) Int. Cl.
*G06F 19/00* (2006.01)
(52) U.S. Cl. .................. 700/99; 700/100; 700/103
(58) Field of Classification Search .............. 700/97, 700/99, 100, 103, 121, 105, 106, 108–110; 702/82, 84
See application file for complete search history.

(56) References Cited

U.S. PATENT DOCUMENTS

| | | | | |
|---|---|---|---|---|
| 5,495,417 A | * | 2/1996 | Fuduka et al. | 700/121 |
| 5,694,325 A | * | 12/1997 | Fukuda et al. | 700/121 |
| 6,259,959 B1 | * | 7/2001 | Martin | 700/99 |
| 6,301,515 B1 | * | 10/2001 | Wagner | 700/109 |
| 6,304,791 B1 | * | 10/2001 | Kim | 700/121 |
| 6,542,830 B1 | * | 4/2003 | Mizuno et al. | 700/121 |
| 6,684,120 B1 | * | 1/2004 | Oku et al. | 700/108 |
| 6,687,558 B2 | * | 2/2004 | Tuszynski | 700/97 |
| 6,725,112 B1 | * | 4/2004 | Kaminsky et al. | 700/97 |
| 7,110,956 B1 | * | 9/2006 | Drake et al. | 705/7 |

OTHER PUBLICATIONS

Stephen J. Shea, et al., "Development and Implementation the Range Management System in a Multi-Flow Fabricator", 1997 IEEE/SEMI Advanced Semiconductor Manufacturing Conference, p. 398-404.

* cited by examiner

*Primary Examiner*—Charles R Kasenge
(74) *Attorney, Agent, or Firm*—James J. Cioffi; Greenblum & Bernstein P.L.C.

(57) ABSTRACT

A method and system for defining optimal range boundaries in a range management system. The method comprises assigning process routings to the flows, applying range break rules to the flows based on the input data regarding operations and toolsets, and outputting the results of the applying step to provide range break boundaries. The system comprises at least one device configured to receive input data, assign process routings to flows, determine range breaks by applying range break rules to the input data and the process routings, and output the results of the determining step.

22 Claims, 3 Drawing Sheets

SYSTEM AND METHOD FOR CREATION OF OPTIMAL RANGE BOUNDARIES IN A RANGE MANAGEMENT SYSTEM

FIELD OF THE INVENTION

The invention relates to the manufacture of integrated circuits, and more particularly, to a system and method for defining optimal range boundaries in a range management system.

BACKGROUND DESCRIPTION

Range Management (RM) is a business process for managing daily work in a manufacturing line, driving reductions in cycle time, inventory, and cost, and driving gains in output and throughput. A standard RM system is focused on delivering work in progress (WIP) on a known route at a known speed to meet customer deliveries on schedule. In a typical RM system, each known route is assigned to a flow. There are usually several flows, each containing a group of routes, which will cover all routes in the manufacturing line. The flows are then broken into a number of ranges, with the goal of creating equal cycle time ranges. Each range contains a collection of processes with raw process times which will ideally sum to one day of cycle time. The end goal is for each product to experience "1 day of cycle time," at the defined speed, in each day (24 hours).

One of the most important aspects of implementing an RM system is setting the range boundaries properly. The range boundaries are the foundation of the system—if they do not divide the flows into equitable portions, the WIP will not move smoothly, resulting in artificially faster or slower regions within each flow. Since each range will necessarily contain operations from several different areas of the manufacturing line, a methodology for determining the appropriate content of each range is often not obvious or straightforward.

One approach is to divide each flow into "best possible" equal raw process time (RPT) units without consideration of range content, possibly followed by slight manual adjustments of the range boundaries. One metric that can be used to judge how equitable the range divisions are is a histogram plot of the range RPT sums for each flow. A well divided set of ranges will have a peak in the distribution very close to the ideal target (RPTsum,target=24 hours/flow X factor), and a very narrow distribution around this peak.

A tight and well focused distribution of the range RPT sums, however, is a necessary but not sufficient condition of a well designed RM system. Dividing operations into ranges based on RPT-based considerations alone ignores the various content and behavior of the operations. Complexities in the flow of WIP must also be considered. Examples of complex WIP flow regions include: (1) rework-sensitive operations; (2) "groups" of operations treated as one logical unit of work by the manufacturing personnel; (3) operations that may be "sampled" at some frequency, such as short measurement operations following process operations; and (4) multi-operation time-sensitive regions.

In another typical RM system, the range boundaries are instead set manually by aligning common process regions that occur in somewhat different locations for each flow. This process will generate the most "human understandable" range boundaries, but it will necessarily produce gaps between the ranges within each flow, since the collection of manufacturing process routes executed in parallel are seldom identical. It is also very difficult to assure equitable distribution of the RPT sum for each range using this approach. Furthermore, this manual process is very time consuming to execute and requires a non-trivial investment in manpower. This presents a problem since the range break process must be executed at some frequency in order to account for changes that will almost always occur to product routings over time.

In another aspect of a standard RM scheme, each flow is broken into ranges using a single X factor (which will be understood by one of skill in the art as cycle-time multiplier, and which is equivalent to cycle-time performance divided by raw process time), reflecting the overall X factor at which the product is planned to run. In reality however, parts flow at different rates through different sections of the line depending on the tools used in that section of the line. Depending on various factors like costs, projected loading and availability, tools are planned to be utilized at different rates. Using a single X factor to break a flow into ranges results in the creation of some ranges in which targets are consistently easily met, and others that are nearly impossible to complete in a day, depending on the toolsets contained in that range. This is a significant problem because real problems hampering line performance are not identified; instead, effort is expended in analysis of areas that are not major concerns.

SUMMARY OF THE INVENTION

In a first aspect of the invention, a method comprises assigning process routings to the flows, applying range break rules to the flows based on the input data regarding operations and toolsets, and outputting the results of the applying step to provide range break boundaries.

In another aspect of the invention, a system comprising at least one device is configured to receive input data and assign process routings to flows. The system is further configured to determine range breaks by applying range break rules to the input data and the process routings, and output the results of the determining step.

In another aspect of the invention, a computer program product comprising a computer useable medium including a computer readable program, wherein the computer readable program, when executed on a computer, causes the computer to receive input data, determine range breaks by applying range break rules to the input data, and output the results of the determining step.

DETAILED DESCRIPTION OF EMBODIMENTS OF THE INVENTION

Figure 1:
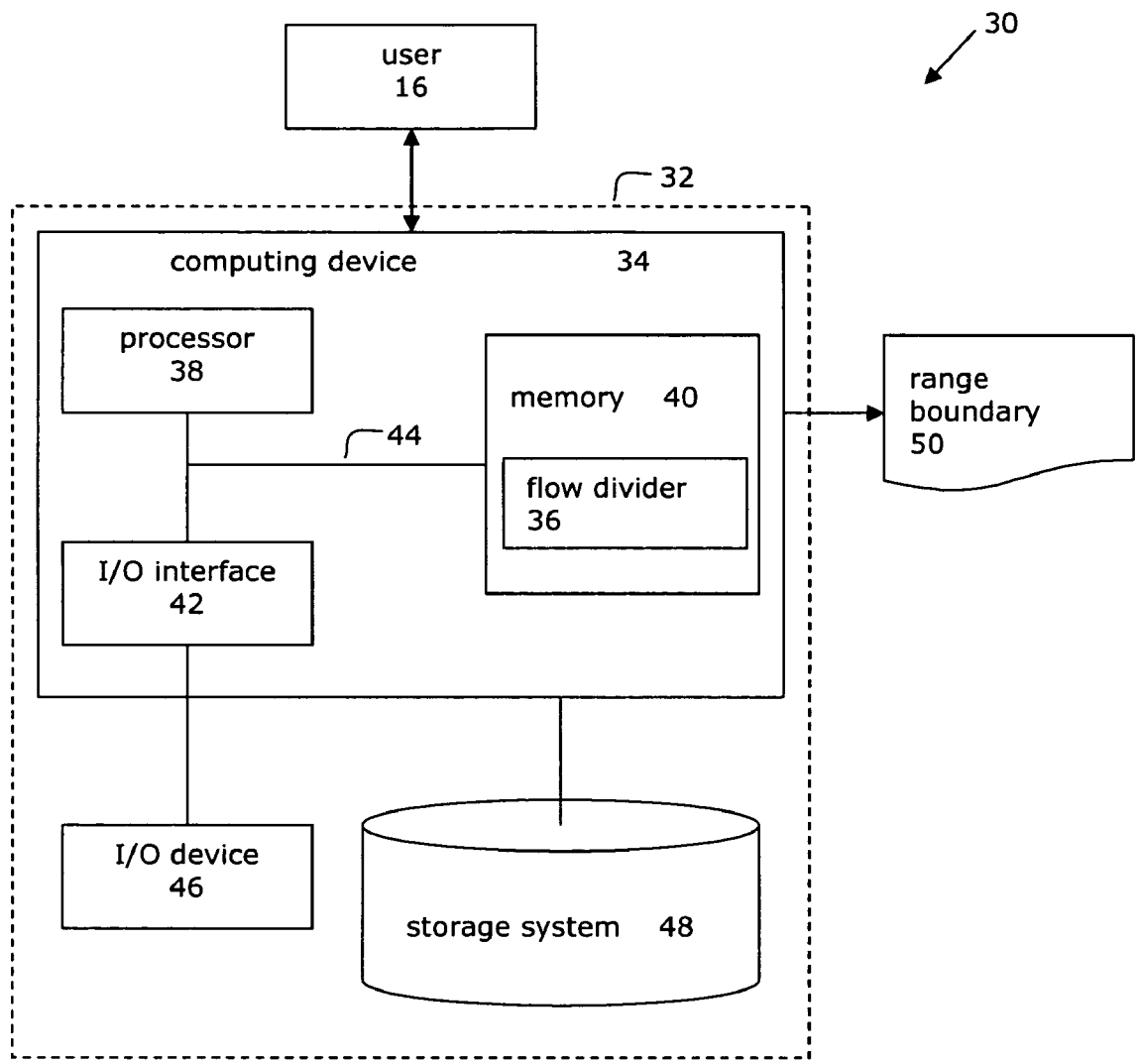
FIG. 1 shows an environment for implementing an aspect of the invention.

The current invention describes a methodology for dividing a list of operations in a manufacturing process route into optimal ranges, based both on equitable RPT distribution and the introduction of "range break rules" to handle the complexities encountered in a typical product manufacturing fabricator (fab). This methodology is highly suitable for automation with a computer and can thus be executed rapidly with very low manpower. An efficient and easy to execute range break process allows for redefinition of new range boundaries as often as the manufacturing team deems necessary.

The current invention describes the usage of certain "range break rules" that guide the optimal creation of ranges in order to take into account the actual WIP flow patterns that are common in a fab. The usage and content of each of the range break rules identified in this invention results in improvement of an existing range management system. These rules can be operation based or toolset based. Since each rule describes either the manner in which WIP is controlled in the fab or the manner in which the toolset consistently acts in the fab, the resulting range break boundaries are much more closely aligned with fab throughput and productivity. Further, the placement of artificial and/or manually determined range boundaries is avoided. Instead, a range break boundary is decided solely on the basis of whether the raw process time target has been met for the range or whether a range break rule must be followed.

Examples of operation-based rules used in the manufacture of semiconductor devices are as follows. 1) A range break boundary must not appear in the following operation sequence: Lithography, Metrology Overlay, Metrology CD. It is a very common fab activity to rework a product lot based on the results of post-lithography overlay and CD measurements. This rework results in the product lot repeating the lithography operation at least once, perhaps several times. It is most appropriate for the lot to stay in this range until it has passed the measurement criteria and it is known that it will not repeat the operation sequence. This presents the least confusion to the range management system since the product lot is not exiting and reentering previous ranges throughout the range day. It also presents the manufacturing team with the highest motivation to complete any necessary reworks at the best available speed in order to complete the processing of each product lot out of the range for that day. 2) A range break boundary must not appear in the following operation sequence: process limited yield (PLY) measurement, PLY optical review, PLY scanning electron microscopy (SEM) review. The personnel in a fab workarea (defined as a group of operations all sharing common tools and processes), such as PLY, may decide to control their work by subdividing the PLY effort into three individual operations. The work conducted on a given product lot through these three operations is interrelated, however, and it is typical in the fab that a lot will either see all three operations or none of the three. This type of behavior is called "grouping of multiple operations into one logical unit of work" and can be generalized to many other workareas. Since it is not appropriate for a lot to exit the range in a particular day until all of the PLY work has been completed, it is not appropriate for a range break to occur in this operation sequence. Note that grouped operations do not have to be optional or inspection-related. Another example of grouped operations occurs in the chemical mechanical polish (CMP) workarea. It is common to have a manual disposition operation follow each CMP operation so that it can be verified that the CMP was completed properly. Similar to the case of the grouped PLY operations, the CMP operation and the post disposition operation must be kept together in the same range to result in the most optimal processing by manufacturing. 3) A range break boundary must not appear between a short RPT measurement operation and the previous process operation. This enables the process owners to get quick feedback on the quality of the process operation with very little impact to the overall fab WIP cycletime distribution. 4) A range break boundary must not appear in a time-sensitive region of the route. It is common in the fab that several operations in a row must be executed in a predetermined amount of time in order to avoid yield degradation due to time-sensitive phenomena (e.g., oxidation and corrosion). It is not optimal for a lot to be shipped out of one range that contains the first half of the time-sensitive operations in the middle of the range day and then be forced to artificially wait until the beginning of the next range day to be prioritized for processing again. All operations within the time-sensitive region should be located within the same range to provide the highest incentive for manufacturing to satisfy both the time target for that list of opers as well as the range target for that day.

Examples of toolset-based rules are as follows. An X factor for each toolset in the flow is used to break out the flow into ranges rather than a single overall X factor. Toolset level X factors are set using the capacity plan and via targets defined by the Industrial Engineering fab personnel. Use of these X factors ensures that the length of each range is realistic. Lots at the beginning of the range can be expected to complete that range in one day, under plan conditions. With this new scheme, the management and control problem is addressed, and failing ranges can be analyzed to identify root causes and can be fixed to improve manufacturing line performance.

With reference to the accompanying drawings, FIG. 1 shows an illustrative environment 30 for managing the processes in accordance with the invention. To this extent, the environment 30 includes a computer infrastructure 32 that can perform the processes described herein. In particular, the computer infrastructure 32 is shown including a computing device 34 that comprises a flow divider 36, which makes computing device 34 operable to perform the processes described herein. The computing device 34 is shown including a processor 38, a memory 40, an input/output (I/O) interface 42, and a bus 44. Further, the computing device 34 is shown in communication with an external I/O device/resource 46 and a storage system 48. As is known in the art, in general, the processor 38 executes computer program code, which is stored in memory 40 and/or storage system 48. While executing computer program code, the processor 38 can read and/or write data, such as the range boundary 50, to/from memory 40, storage system 48, and/or I/O interface 42. The bus 44 provides a communications link between each of the components in the computing device 34. The I/O device 46 can comprise any device that enables an individual to interact with the computing device 34 or any device that enables the computing device 34 to communicate with one or more other computing devices using any type of communications link.

In any event, the computing device 34 can comprise any general purpose computing article of manufacture capable of executing computer program code installed thereon (e.g., a personal computer, server, handheld device, etc.). However, it is understood that the computing device 34 is only representative of various possible equivalent computing devices that may perform the processes described herein. To this extent, in other embodiments, the functionality provided by computing device 34 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 32 is only illustrative of various types of computer infrastructures for implementing the invention. For example, in one embodiment, the computer infrastructure 32 comprises two or more computing devices (e.g., a server cluster) that communicate over any type of communications link, such as a network, a shared memory, or the like, to perform the process described herein. Further, while performing the process described herein, one or more computing devices in the computer infrastructure 32 can communicate with one or more other computing devices external to computer infrastructure 32 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the range boundary setter 36 enables computer infrastructure 32 to set the range boundary 50.

Figure 2:
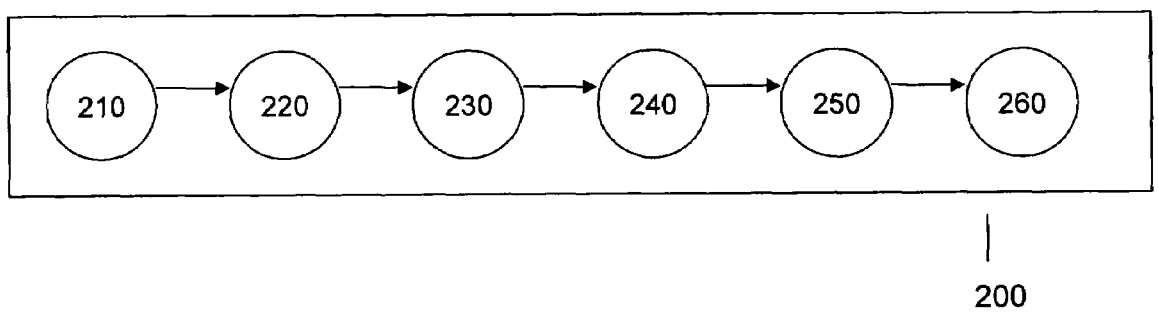
FIG. 2 is an illustrative example of the sequence of operations in a route.

FIG. 2 is an illustrative example of the sequence of operations in a process route 200. In the figure, WIP moves along the route, from left to right, as each operation is competed. For example, as a wafer moves through the fab, it will move from lithography 210, to metrology overlay 220, to metrology CD 230, etc. In this example, a first range might include only the operations 210-230, and a second range might include operations 240, 250 and 260.

Figure 3:
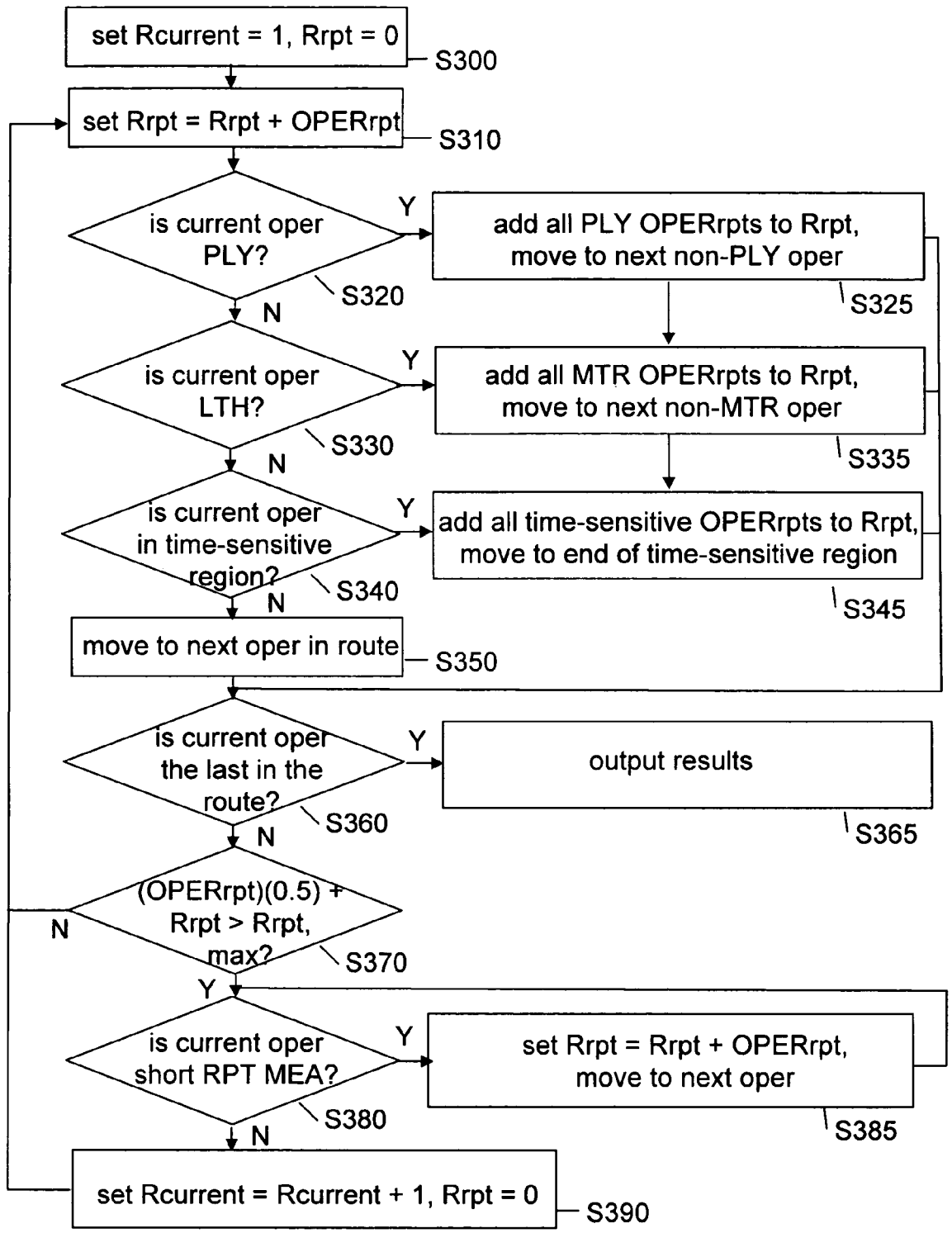
FIG. 3 is a flow chart illustrating steps in accordance with the invention.

FIG. 3 is a flow chart illustrating steps in accordance with the invention. The steps of FIG. 3 (as well as any other flows) may be representative of a high-level block diagram implementing the steps thereof. The present invention can take the form of an entirely hardware embodiment, an entirely software embodiment or an embodiment containing both hardware and software elements, or the invention can be executed entirely or partially manually. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD.

Referring again to FIG. 3, in embodiments, at Step 300, the range break process begins by identifying a manufacturing process routing (e.g., a route) which consists of an ordered sequence of manufacturing process steps (e.g., operations or opers). A route in a typical complex manufacturing line, e.g., a manufacturing line for ultra-large scale integration (ULSI) semiconductor devices, may contain 500-1000 opers. Each process step has a well-defined raw process time (e.g., RPT or OPERrpt), which is the time required to process a product through the operation's toolset in the absence of all other products and toolset load. Each process step may also have certain markings or "tags" which identify that process step as being associated with: (a) a rework route region, (b) a multi-operation route region that exists as separate operations but is effectively treated as one unit of work by the personnel on the manufacturing floor; (c) an optional operation that may have some sampling rate that is less than 100%, with no impact to the product build; and/or (d) an operation in a time-sensitive route region. Any or all of these behaviors are typical behaviors that can occur in any manufacturing line producing any product.

As shown at Step 300, the first operation in the route is assigned as the beginning of range 1 (Rcurrent=1), and the first operation's RPT is at this point the only RPT contribution to range 1. Note that the ideal target RPT sum for the collection of operations in any range is well defined as: RPTsum, target=24 hours/chosen X factor for the flow. The manufacturing team can choose the X factor to be any desired value above 1.0 X, but it is typically a value between 2.0 X and 4.0 X. As the formula shows, the lower the X factor, the higher the target RPT sum for each range and thus the more operations will be present in any given range. Since the goal of the range management system is to drive product through each range in a 24 hour period, the flows, and thus routes, that are assigned the lowest X factors will output product the fastest.

Referring again to FIG. 3, at Step 310, the operation's RPT is added to the RPT sum counter for the current range (Rrpt). With successive iterations, this sum counter totals the RPTs for each operation in the range.

At Steps 320 through 340, the operation's markings or tags are considered to determine if any range breaking rules apply to the oper. For example, at Step 320, if the operation is tagged as PLY (e.g., process limited yield), then it is known that this is the beginning of a short sequence of operations (e.g., 2-4 opers), that will all be marked with the PLY tag. Each of the PLY operations are distinct and executed on different toolsets, but the manufacturing personnel will treat this group of operations as one unit of work. An example of three PLY operations that may occur together in a typical product manufacturing fabricator are: (1) inspect the product to determine an overall defect count; (2) inspect a subset of the defects at minimum resolution to bucketize or classify them; and (3) inspect another subset of the defects as maximum resolution to classify them. If these PLY opers were to be put in two adjacent ranges, and not kept in the same range, then the situation can arise where WIP is "stopped" in the middle of the operation sequence. The stoppage of WIP as it exits a range before the end of the range day is a common phenomenon and occurs when the following range's WIP is too high. This occurs by design in any range management system to prevent the unneeded buildup of WIP in front of a bottleneck tool or other short-term blockage. The stoppage of WIP in the PLY operation sequence is very disruptive to the natural flow of WIP on the manufacturing floor, however, and does not lend itself to efficient operation of the fab, nor controlled movement of the product at a predetermined X factor. Therefore, if, at Step 320, the operation is determined to be tagged as PLY, then, at Step 325, all PLY OPERrpts are added to the Rrpt, then move to the next non-PLY oper, and go to Step 360. At Step 320, if the operation is not PLY, then go to Step 330.

At Step 330, if the operation is tagged as LTH (e.g., lithography), then it is known that this operation begins a short sequence of steps (typically 2-4 opers) that may involve product rework. A product can be a candidate for rework if the product is processed through one operation, and then a subsequent measurement operation determines that the previous process operation was faulty in some way. Typically, the majority of process steps that a product sees are not reworkable. Perhaps only 10% of the total process steps can be "undone" and "redone" several times so as to realize the best possible process. An example of a reworkable operation in a ULSI semiconductor fab is a photo-lithography operation. All of the measurement operations that occur after the operation with the LTH tag and that can determine if the product is a candidate for rework will have the MTR (e.g., metrology) tag.

After the product passes the last MTR tag, it can no longer be reworked and sent back to the LTH operation to repeat the operation sequence. Thus, it is preferable for the LTH and MTR operations to be kept together in the same range so that the product does not hop back and forth between adjacent ranges in one 24 hour range day as one or more reworks occur. A range management system that allows WIP to move back and forth between adjacent ranges in one day will not be able to properly count the state of the WIP, which will result in an undesirable disruption to the natural flow of WIP through the manufacturing line. Therefore, if, at Step 330, the operation is determined to be tagged as LTH, then, at Step 335, all MTR OPERrpts are added to the Rrpt, then move to the next the non-MTR operation, and go to Step 360. At Step 330, if the operation is not LTH, then go to Step 340.

At Step 340, if the operation is tagged as Q-time (e.g., time-sensitive), then it is known that this operation begins a sequence of steps (typically 2-10 opers) that are important to execute in a specified amount of time. The evidence of the need for such time-dependent route regions usually arises when it is determined that the product quality is lower when the product travels more slowly through this route region as compared to when it travels more quickly. An example of the beginning of a time dependent route region in the manufacture of ULSI semiconductors is at the point when a somewhat reactive metal is deposited. Since the metal may react with the ambient, the longer time that the metal is exposed to the ambient, the greater the chance for the degradation in the quality of the metal, for example, by corrosion. There may be the need for several intervening steps before the next, less reactive, layer is deposited which properly caps the reactive metal layer. Clearly it is advantageous for the product quality to have this sequence of operations located in the same range so that the WIP will move through these operations within one range day. Therefore, if, at Step 340, the operation is determined to be tagged as Q-time, then, at Step 345, all Q-time OPERrpts are added to the Rrpt, then move to the end of the Q-time operation, and go to Step 360. At Step 340, if the operation is not Q-time, then go to Step 350.

Referring again to FIG. 3, at Step 350, move to the next operation in route. At Step 360, examine the route to see if any additional operations remain. If there are no more operations in the route, then, at Step 365, the results are output and the range break process is complete. The output results may be exported in a standard spreadsheet format such as a comma separated value (CSV) file, and in a preferred embodiment, output to a relational database such as DB2. Alternatively, the results may be outputted to a server that is accessible by other applications, such as a manufacturing real-time dispatcher, and various manufacturing reports. After the results have been output, the range breaks as determined by the application of the rules may be manually overridden.

If, at Step 360, there are more operations to consider, then, at Step 370, the sum of the RPT in the current range is compared to the target RPT (e.g., RPTsum,target or Rrpt, max). This is done by comparing half of the current operation's RPT to the current RPT sum (Rrpt). The reason for this 0.5 factor is that it has been empirically determined that the final histogram of range RPTs is tighter after the range break process has been completed. In other words, if half of the current operation's RPT could still "fit" into the current range, then the operation should be considered a member of the current range. But if even half of the current operation's RPT is large enough to exceed the target RPT sum for the range, then it more appropriate to consider the current operation as the starting operation in the next range.

At Step 380, it is determined whether to allow an exception to the exception to the 0.5 operation RPT rule discussed above, that is, whether a process step is followed by a very short MEA (measurement) step. It is typical in a manufacturing line that some percentage, say 20-40%, of the measurements can be executed very quickly. It can be very advantageous to provide the product engineers with more rapid feedback on the quality of the previous process step by including the short RPT measurement step in the same range as the process step. This small perturbation to the width of the range RPT histogram is well worth the time saved in learning whether the product should continue in the line or whether it has become defective and should be removed. An example of such a small RPT measurement step in a ULSI fab is a laser thickness measurement of a deposited film. It is also typical in a manufacturing line to have some percentage, for example 20-40%, of the measurements in a route be sampled. In other words, since a measurement operation is by definition optional since it is not required to manufacture the product, it is not always worth the time to collect all measurements from all products. Some measurements will thus be sampled or omitted for some portion of the WIP, effectively resulting in a zero hour RPT for this step. So from this viewpoint also it is more preferable to keep the short measurement operations following a process operation in the same range as the process operation, since it is not appropriate to stop WIP in front of a measurement that may never be executed at all. Therefore, if, at Step 380, the operation is determined to be tagged as a short RPT MEA operation, then, at Step 385, OPERrpt is added to the Rrpt and return to Step 380. At Step 380, if the operation is not a short RPT MEA operation, then go to Step 390.

At Step 390, once it has been determined that the current range is "full" (Rrpt is close to or has exceeded RPTsum, target), the range break process is started again from the beginning for the next range by returning to Step 310. This iterative process results in the division of route operations into ranges of equitable RPT, while also taking into consideration the actual flow of WIP in the fab via operation tags and range break rules.

The inventive method may be repeated periodically or ad hoc as necessary, for example, as new process flows are introduced into the fab. In embodiments, the range break process is performed monthly.

The inventive method can be generalized to any fab's operation by a person skilled in the art by utilizing the underlying reasons for the rule creation as described herein (e.g., rework, similar work spread over several opers, time-sensitive regions, known tool utilization differences, etc.).

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multi-chip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those skilled in the art will recognize that the invention can be practiced with modifications and in the spirit and scope of the appended claims.

What is claimed is:

1. A method comprising:
   assigning manufacturing process routings to flows wherein each flow contains a group of manufacturing process routes;
   applying range break rules to the flows based on input data regarding operations and toolsets;
   one of:
     dividing a list of the operations in a manufacturing process route into optimal ranges based on raw process time distribution and the range break rules; and
     using range boundaries to divide the flows into equitable portions; and
   outputting results of the applying step to provide range break boundaries,
   wherein the assigning, applying and outputting are implemented with a computer infrastructure.

2. The method of claim 1, further comprising outputting data in a standard spreadsheet format.

3. The method of claim 2, wherein the output data comprises range break data.

4. The method of claim 1, wherein the steps of claim 1 are repeated periodically.

5. The method of claim 1, wherein the range break rules are based on characteristics of operations.

6. The method of claim 1, wherein the range break rules are based on characteristics of toolsets.

7. The method of claim 1, wherein the method is implemented in a range management process used to fabricate integrated circuits and the range break rules take into account actual work-in-process flow patterns.

8. The method of claim 1, wherein each range break rule describes one of:
   a manner in which work-in-process is controlled; and
   a manner in which toolsets consistently act.

9. The method of claim 1, wherein the method decides a range break boundary solely on a basis of one of:
   whether a raw process time target has been met for a range; and
   whether a range break rule must be followed.

10. A method comprising:
    assigning process routings to flows;
    applying range break rules to the flows based on input data regarding operations and toolsets;
    dividing the flows into equitable portions; and
    outputting results of the applying step to provide range break boundaries,
    wherein the input data comprises:
      a list of operations;
      process names for each operation;
      X factors assigned to flows;
      raw processing times for each operation; and
      locations for time-sensitive operations,
    wherein the assigning, applying and outputting are implemented with a computer infrastructure.

11. A method comprising:
    assigning process routings to flows;
    applying range break rules to the flows based on input data regarding operations and toolsets;
    dividing the flows into equitable portions; and
    outputting results of the applying step to provide range break boundaries,
    wherein the range break rules comprise at least one of:
      time-sensitive route regions are kept together within a same range;
      rework-sensitive regions are kept in the same range;
      short raw process time (RPT) measurement operations are kept in the same range as the preceding process operation;
      keep post-disposition steps in the same range with the assigning, applying and outputting; and
      process limited yield steps are kept together within the same range,
    wherein the assigning, applying and outputting are implemented with a computer infrastructure.

12. A system comprising at least one computing device implementing instructions stored on a computer readable storage medium configured to:
    receive input data;
    assign manufacturing process routings to flows wherein each flow contains manufacturing process routes;
    determine range breaks by applying range break rules to the input data and the manufacturing process routings; and
    output results of the determining steps
    wherein the system divides a list of operations in each manufacturing process route into optimal ranges based on raw process time distribution and the range break rules.

13. The system of claim 12, further comprising providing capabilities of manually overriding the results of the determining step.

14. The system of claim 12, wherein the results are output in the computer readable storage medium.

15. The system of claim 14, wherein the range break rules comprise grouping post-disposition steps in a same range with previous process steps.

16. The system of claim 14, wherein the range break rules comprise grouping time-sensitive steps within a same range.

17. The system of claim 14, wherein the range break rules comprise grouping steps that are treated as one logical operation within a same range.

18. The system of claim 14, wherein the range break rules comprise grouping rework-sensitive steps within a same range.

19. The system of claim 14, wherein the range break rules comprise grouping short raw process time post measurement operations.

20. The system of claim 14, wherein the range break rules are based on characteristics of operations.

21. The system of claim 14, wherein the range break rules are based on characteristics of toolsets.

22. A computer program product comprising a computer readable storage medium including a computer readable program stored on the computer readable storage medium and usable with a computer, wherein the computer readable program, when executed on the computer, causes the computer to:
    receive input data;
    determine range breaks by applying range break rules to the input data;
    dividing a list of operations in a manufacturing process route into optimal ranges based on raw process time distribution and range break rules; and
    output results of the determining step,
    wherein the range break rules are one of manufacturing process based and manufacturing toolset based.

* * * * *

UNITED STATES PATENT AND TRADEMARK OFFICE
CERTIFICATE OF CORRECTION

PATENT NO. : 7,653,450 B2 Page 1 of 1
APPLICATION NO. : 11/393028
DATED : January 26, 2010
INVENTOR(S) : Burda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Twenty-third Day of November, 2010

David J. Kappos
*Director of the United States Patent and Trademark Office*